United States Patent Office 3,804,913
Patented Apr. 16, 1974

3,804,913
PROCESS IMPROVEMENT FOR THE MANUFACTURE OF TRIMETHYL CYCLODODECATRIENE
Charles M. Goodwin, East Windsor, N.J., assignor to Cities Service Company, New York, N.Y.
No Drawing. Filed Oct. 12, 1972, Ser. No. 297,167
Int. Cl. C07c 3/10
U.S. Cl. 260—666 B        4 Claims

ABSTRACT OF THE DISCLOSURE

Improved results are obtained in the oligomerization of isoprene to form trimethyl cyclododecatriene when the reactor is partially vented, after the completion of the formation of the catalyst composition and before onset of appreciable oligomerization. The vented products are mainly those formed by reaction of triethyl aluminum with various impurities in the reactor.

BACKGROUND OF THE INVENTION

This invention relates to the production of a cyclic polyunsaturated olefin from a diene. More particularly, it relates to an improvement in the production of a cyclic triene, such as trimethylcyclododecatriene, from a conjugated diene, such as isoprene.

Trimethylcyclododecatriene can be produced by the polymerization or oligomerization of ethylenically unsaturated monomers, as described in F. T. Wadsworth's "Trimethyl Cyclododecatriene Process," U.S. 3,429,940, issued Feb. 25, 1969, which patent is hereby incorporated by reference. The parameters of catalyst preparation and the subsequent oligomerization reaction have been discussed in this reference.

In the method described in the above patent a conjugated methyl butadiene is oligomerized to form a cyclic triene, and typical conversions (the percent of the original diene converted to other materials divided by the weight of the diene originally present), selectivity (the weight of the desired product divided by the total weight of the conversion products) and yields (weight of desired product divided by the weight of the diene monomer) of the methyl butadienes to the cyclic trienes have been about 85, 37, and 31%, respectively. Although some small scale laboratory runs may show better results, these numbers are typical of pilot plant and semi-commercial runs.

SUMMARY OF THE INVENTION

An improvement in the above oligomerization process has now been discovered using this procedure:

(a) The catalyst composition is charged to the reactor, (b) Within from about 0.1 minute to about 10 minutes after the addition of the final catalyst component, the reactor is vented for a length of time necessary to reduce the reactor pressure to about 1–25 p.s.i.g.

(c) The vent is closed, and the oligomerization reaction is allowed to proceed to the completion of the scheduled reaction time.

Broadly, the invention concerns an oligomerization process comprising reacting, in an inert atmosphere in a reactor, a mixture consisting essentially of (a) a chromium compound component in which the chromium is present in a positive valence state, (b) an aliphatic hydrocarbyl halide component selected from the group consisting of aliphatic chlorides, bromides and iodides, with the atomic ratio of halogen to chromium in said components varying from about 1 to about 25, (c) a hydrocarbyl aluminum component, and (d) a conjugated methyl butadiene, and allowing oligomerization to proceed, wherein the improvement comprises:

venting vapors from the vapor space of the reactor, after the completion of the addition of the final catalyst component and before the onset of appreciable oligomerization.

DESCRIPTION OF PREFERRED EMBODIMENTS

The above invention is applicable to the oligomerization of methyl butadienes rather than to the oligomerization of butadiene, due to the difference in vapor pressure of the monomers at a typical reaction temperature. Thus, venting of a reaction mixture including butadiene would result in a greater loss of monomer than if a corresponding mixture including methyl butadiene were vented.

As mentioned in one embodiment in the reference patent, the oligomerization or polymerization reaction is initiated by reacting the chromium component and aliphatic halide component in the presence of a catalytic amount of unsaturated monomer, followed by the addition of the aluminium component. The usual practice is then to continue the addition of incremental amounts of the diene.

It is important that the oligomerization of the methyl butadienes be carried out in an inert atomsphere. In this instance, an inert atmosphere can mean one containing an overwhelming majority (such as 99 volume percent, of a gas inert to the pertinent reaction. Typically, inert gases for most organic reactions are exemplified by helium, neon, argon, krypton, xenon and nitrogen. Because of its commercial availability and purity, nitrogen is a preferred inert gas for the present oligomerization. An inert atmosphere can also mean the absence of an appreciable amount of a gas, such as by evacuation of a reaction vessel prior to a reaction. An inert atmosphere can further include an atmosphere containing appreciable amounts of the vapor of an inert solvent, for example benzene or hexane. Thus, if a reactor is evacuated under commercial vacuum conditions and a benzene solution of a catalyst component is introduced into the reactor, an inert atmosphere satisfying the above guidelines is obtained.

The major change in the procedure, and the central point of this invention, lies in the venting, or reduction of internal pressure, of the reactor. Venting typically means opening a connecting passageway between a reactor and the surrounding atmosphere, usually to allow excess gases to leaves the reactor. Since a typical procedure is to form the catalyst system in the presence of an unsaturated monomer and then to continue incremental addition of the monomer, the venting is preferably done after the addition of the final catalyst component, usually the aluminum component, and before the onset of appreciable oligomerization or introduction of the additional unusaturated monomer. By "onset of appreciable oligomerization" is meant that, broadly, the oligomerization reaction has converted less than about 10% of the reactive diene monomer. In the case of a batch reaction, in which the catalysts composition contacts the bulk of the diene, the venting would preferably be done after the catalyst has been added and before appreciable reaction has occurred. In the case of a semi-batch operation, in which the diene is added on demand, venting would preferably be done before the addition of diene is started. If a small amount of diene is added as a part of the catalyst composition preparation, venting preferably follows completion of the formation of the catalyst, even though a small amount of diene may be left unreacted, and before the introduction of additional monomer. Broadly, the time delay between the completion of catalyst formation and venting can range from about a few seconds, such as 0.1 minute, to about 10 minutes, depending on the procedure followed, the skill of the operator and the pressure increase noted after the completion of catalyst formation. A more desirable time delay is from about 2 to about 5 minutes. Some oligomerizations may call for charging of the reactor at ambient temperature, while variations may allow heating to be started while the last catalyst component is being added. Also, there may be some exothermal heat from the catalyst preparation. The application of heat, from whatever source, naturally causes an increase in the vapor pressure of various reactor components, resulting in a pressure rise in the reactor. This pressure increase is the reaction variable that leads to the need for venting. If the increase is slow, the onset of venting is delayed, while a rapid increase in pressure is a cause for early venting.

The vented vapors are typically low molecular weight gases, believed to be formed by the reaction of the hydrocarbyl aluminum component with reactive impurities in the reaction mixture. These impurities can be, for example, traces of moisture, residual oxygen, hydrolysis products of t-butyl chloride, etc. The vented material can also contain solvent or reactant vapors arising from various catalyst components and monomers.

There are several factors involved in the rate of pressure increase, the ultimate pressure obtained prior to venting, the duration of venting, the final pressure prior to the cessation of venting, the time at which heat is applied to the reactor and the rate of heating. Typical reactor pressures (prior to venting) may be from about 10 to about 75 p.s.i.g., while the final pressure (prior to addition of monomer) may be from about 1 to about 25 p.s.i.g., preferably from about 2 to about 10 p.s.i.g. The venting procedure itself is mainly concerned with the rate and duration of venting. The rate is typically controlled by a valving means (such as a ball, gate or globe valve), with a fully opened valve venting the volatile components or reducing the reactor pressure faster than a partially opened valve. The duration of venting is typically regulated by the initial and final pressures of the reactant, with a small lowering of pressure requiring a shorter venting time than a major pressure change, assuming the valve setting is the same for each case. Broadly, the pressure drop is the major measured change, with the duration and rate of venting combining, in a generally inverse proportion, to give the desired result.

As mentioned above, volatile components or vapors are vented, meaning that the vent opening is in the vapor space of the reactor. The venting before reaction is different and distinguishable from the venting after completion of the reaction.

Since the vapor pressure of the conjugated unsaturated monomer increases with temperature, venting is preferably done at ambient temperature, prior to heating to the desired reaction temperature. Venting can be done at reaction temperature, but this leads to a greater loss of monomer. At ambient temperature, only a modest amount of monomer is discharged through the vent line, and this slight loss of available monomer is more than compensated for by the increased yield resulting from the venting operation.

The advantages inherent in the instant invention will be evident from the following examples.

EXAMPLES I–III (CONTROL)

A clean, dry, stirred 15-gallon reactor is evacuated and charged with, in order, (a) 9.5 lbs. polymerization grade isoprene, (b) 4.6 lbs. of a 13.3 weight percent benzene solution of chromium (III) acetyl acetonate, (c) 1 lb. tertiary butyl chloride and (d) 12 lbs. of a 20 weight percent benzene solution of triethylaluminum. During this addition, the autoclave temperature rises to about 35° C., and the reactor pressure varies from about 12 p.s.i.g. to about 25 p.s.i.g. The reactor is then heated to about 60° C., and isoprene is added, on demand, so as to maintain a pressure of about 55 p.s.i.g. Isoprene addition is maintained for about 3 hours, at the end of which time the isoprene flow is stopped, the autoclave is cooled and vented, and the reactor contents are quenched by the addition of 7 gallons of methanol. Analysis of the product for three runs shows an average percent conversion of isoprene of about 85%, an average selectivity of converted materials to trimethylcyclododecatriene of about 38%, and an average yield of trimethylcyclododecatriene from isoprene of about 32%.

EXAMPLES IV–VII

Using the same recipe, work-up procedure and method of calculation, the above examples are repeated except that the reactor is vented between the completion of catalyst formation and the start of appreciable oligomerization. The following table shows the variables used and the results obtained.

TABLE I

| Run No. | Temp., °C. at venting time | Pressure (p.s.i.g.) | | Product, percent | | |
|---|---|---|---|---|---|---|
| | | Before venting | After venting | Conversion | Selectivity | Yield |
| 4 | 40 | 20 | 7 | 88 | 47 | 41 |
| 5 | 50 | 29 | 3 | 91 | 55 | 50 |
| 6 | 63 | 40 | 5 | 92 | 53 | 49 |
| 7 | 50 | 32 | 10 | 90 | 44 | 40 |

EXAMPLE VIII

Using the same recipe as Example I but charging all of the monomer to the reactor first and then adding the catalyst components, with the aluminum component being added last and with venting being done after completion of the catalyst composition and before additional heat was applied to the reactor, it is noted that venting gives an improvement in ultimate yield. The reactor temperature at the conclusion of catalyst formation is 43° C., and the reactor pressure is 50 p.s.i.g. The reactor is vented until the pressure equals 8 p.s.i.g., and then the reactor is raised to 60° C. for the remainder of the run. Although the semi-batch method is preferred, this batch-wise addition of monomer results in 85% conversion, 41% selectivity and 35% yield, showing an improvement over the prior art processes of Examples I–III.

While the present invention has been described herein with reference to particular embodiments thereof, it will be appreciated by those skilled in the art that various changes and modifications can be made without departing from the scope of the invention as set forth.

What I claim is:

1. In an oligomerization process comprising reacting, in an inert atmosphere in a reactor, a mixture consisting essentially of a chormium compound component in which the chromium is present in a positive valence state, an aliphatic hydrocarbyl halide component selected from the group consisting of aliphatic chlorides, bromides and iodides, with the atomic ratio of halogen to chromium in said components varying from about 1 to about 25, a hydrocarbyl aluminum component, and a conjugated methyl butadiene and allowing the oligomerization to proceed, the improvement which comprises:
   venting vapors from the vapor space of the reactor, after completion of the addition of the final catalyst component and before the onset of appreciable oligomerization.

2. The process of claim 1 wherein:
   (a) The conjugated methyl butadiene is isoprene,
   (b) The chromium compound component is chromium (III) acetylacetonate,
   (c) The aliphatic hydrocarbyl halide component is tertiary butyl chloride,
   (d) The hydrocarbyl aluminum component is triethyl aluminum, and (e) The time period between the completion of catalyst formation and the onset of the venting is from about 0.1 minute to about 10 minutes.

3. The process of claim 2 wherein:
a first reactor pressure, after completion of the addition of the final catalyst component, is between about 10 and about 75 p.s.i.g., and
a second reactor pressure, after venting and prior to the onset of appreciable oligomerization, is from about 10 p.s.i.g., resulting in a reactor pressure loss of from about 8 to 65 p.s.i.g.

4. The process of claim 2 wherein the time period is from about 2 to about 5 minutes.

References Cited
UNITED STATES PATENTS

| | | | |
|---|---|---|---|
| 3,429,940 | 2/1969 | Wadsworth | 260—666 B |
| 3,167,593 | 1/1965 | Mueller | 260—666 B |
| 3,231,627 | 1/1966 | Royston | 260—666 B |
| 3,390,196 | 6/1968 | Chappell et al. | 260—666 B |

DELBERT E. GANTZ, Primary Examiner

V. O'KEEFE, Assistant Examiner

U.S. Cl. X.R.

260—666 R